United States Patent
Murcia et al.

(10) Patent No.: US 6,821,595 B2
(45) Date of Patent: Nov. 23, 2004

(54) COMPOSITE MATERIAL PANELING AND METHOD OF MAKING THE SAME

(75) Inventors: Philippe R. Murcia, White Plains, NY (US); Robert J. Hess, New York, NY (US)

(73) Assignee: Ecoem, L.L.C., Greenwich, CT (US)

( * ) Notice: Subject to any disclaimer, the term of this patent is extended or adjusted under 35 U.S.C. 154(b) by 0 days.

(21) Appl. No.: 10/081,034

(22) Filed: Feb. 21, 2002

(65) Prior Publication Data

US 2003/0157301 A1 Aug. 21, 2003

(51) Int. Cl.$^7$ .............................. B32B 5/12; B28B 5/00; B29C 63/00
(52) U.S. Cl. .............................. 428/49; 428/2; 428/106; 428/110; 428/178; 428/188; 428/464; 428/496; 428/511; 428/528; 428/541; 428/903.3; 428/921
(58) Field of Search ................................. 428/2, 49, 50, 428/77, 78, 106, 110, 178, 188, 196, 464, 481, 496, 507, 508, 511, 528, 595, 541, 903.3, 920, 921

(56) References Cited

U.S. PATENT DOCUMENTS

| | | | | |
|---|---|---|---|---|
| 3,228,822 A | * | 1/1966 | Norman | 428/188 |
| 5,535,897 A | * | 7/1996 | Gobidas | 211/105.2 |
| 5,589,260 A | * | 12/1996 | Zvi et al. | 428/327 |
| 5,738,924 A | * | 4/1998 | Sing | 428/68 |
| 5,786,280 A | * | 7/1998 | Funger et al. | 428/64 |

* cited by examiner

Primary Examiner—Donald J. Loney
(74) Attorney, Agent, or Firm—Gibbons, Del Deo, Dolan, Griffinger & Vecchione

(57) ABSTRACT

A composite material panel having alternating layers of wood veneer with recycled or waste material. The layers are sandwiched together. The technique involves forming the composite material layer by layer and employing materials in each layer that are suited to satisfy requirements for specific kinds of construction. The layer of recycled or waste material is preferably flexible and has memory. Some examples include plastic straw, bars from plastic, tires or metal, balls from plastic or tires, sheet from plastic, tires or metal, air bubble cushioning from plastic. The metal is exemplified by aluminum and tin.

15 Claims, 4 Drawing Sheets

COMPOSITE MATERIAL PANELING AND METHOD OF MAKING THE SAME

BACKGROUND OF THE INVENTION

1. Field of the Invention

The present invention relates to paneling made of a composite material of wood waste, sawdust, discarded tires and recyclable items and a method of making the same. The paneling has memory and has channels through which may be conveyed a fluid such as air.

2. Description of Related Art

Materials used in the construction of furniture, boats, homes, farms, porches, driveways, stairs, tiles, roofing tiles, etc. varies depending upon the specific requirements for such construction. Conventionally, the techniques used to make such materials has varied since the characteristics and properties of the materials that are suited for satisfying those specific requirements likewise varies depending upon the kind of construction involved. That is, the material that is suited for construction of a driveway to satisfy certain requirements for constructing driveways may not be suited for construction of a boat that needs to satisfy different requirements and vice versa so the techniques used to make each kind of material has conventionally varied.

The need for finding useful products for waste and recycled products continues to remain unsatisfied, even though they are readily available. It would be desirable to transform such waste and recycled products and incorporate them into a common technique for the manufacture of paneling that provide a sufficient amount of abrasion and mechanical resistance, insulation, flexibility, solidity, and memory to satisfy or exceed specific requirements for different kinds of construction.

Further, it would be desirable if such paneling enabled air circulation through the panel and had a better strength to weight ratio than wood alone and was aesthetically pleasing.

SUMMARY OF THE INVENTION

One aspect resides in a composite material panel having alternating layers of wood veneer with recycled or waste material. The layers are sandwiched together. The technique involves forming the composite material layer by layer and employing materials in each layer that are suited to satisfy requirements for specific kinds of construction. The layer of recycled or waste material is preferably flexible and has memory. Some examples include plastic straw, bars from plastic, tires or metal, balls from plastic or tires, sheet from plastic, tires or metal, air bubble cushioning from plastic. The metal is exemplified by aluminum and tin.

BRIEF DESCRIPTION OF THE DRAWING

For a better understanding of the present invention, reference is made to the following description and accompanying drawings, while the scope of the invention is set forth in the appended claims:

DETAILED DESCRIPTION OF THE INVENTION

Figure 1:
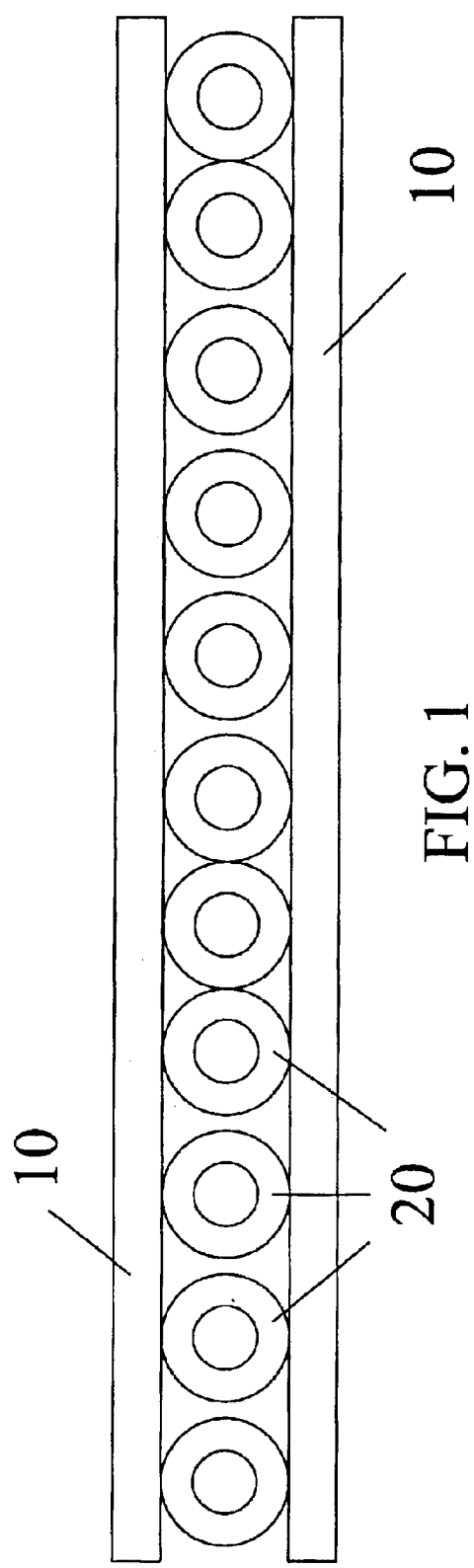
FIG. 1 is a cross section of one layer of the composite material panel with memory.

Turning to FIG. 1, a layer of materials are shown that include a solid layer 10 and an air passage layer 20. The air passage layer includes a material that is configured to define an air passage and that has memory to resiliently return to its original shape after distortion forces are removed.

The solid layer 10 may be made of any of the following materials or combination thereof: timber, wood waste, sawdust or other recycled wood based material. The air passage layer 20 is made from any of the following materials or combination thereof and configured to form a circular exterior surface (such as a ball, bar or tube): recycled plastic bottles, carpet, rugs; tires; aluminum or tin cans, foil or plates; plastic straws, or plastic air bubble cushioning.

The timber, wood waste and sawdust may come from a forested area that is being, or recently has been, logged. The timber may come from the logs. The wood waste may come from any part of a cut tree that has not been used for other purposes, including portions of the tree trunk, and large branches. The sawdust from forestry or sawmills.

The plastic may come from recycled bottles, carpets, or rugs made of plastic material. The tires come from recycling used tires. The aluminum cans are provided from recycling.

The production of layer 10 varies depending upon the source of material used. If timber is the source, then the processing step is either to uncoil or slice tiny sheets of wood of about 1 mm thickness from a trunk of a tree to resemble veneer. If wood waste is the source, then the processing step is to slice tiny sheets of wood of about 1 mm thickness from branches to resemble veneer. If sawdust is the source, then the sawdust is compounded and held together with glue or other chemical bonding agent to obtain tiny sheets of wood of 1 mm of thickness to resemble veneer. In all cases, the end product, which are tiny slices of wood that resemble veneer, are further treated to render them resistant to fire, insects and water.

The production of layer 20 varies depending upon the end shape. The materials are cut are melted and formed into the desired end shape. The possible end shapes include: straws having a diameter of 3 mm, air bubble cushioning having a diameter of 3 mm, balls having a diameter of 3 mm.

Figure 2:
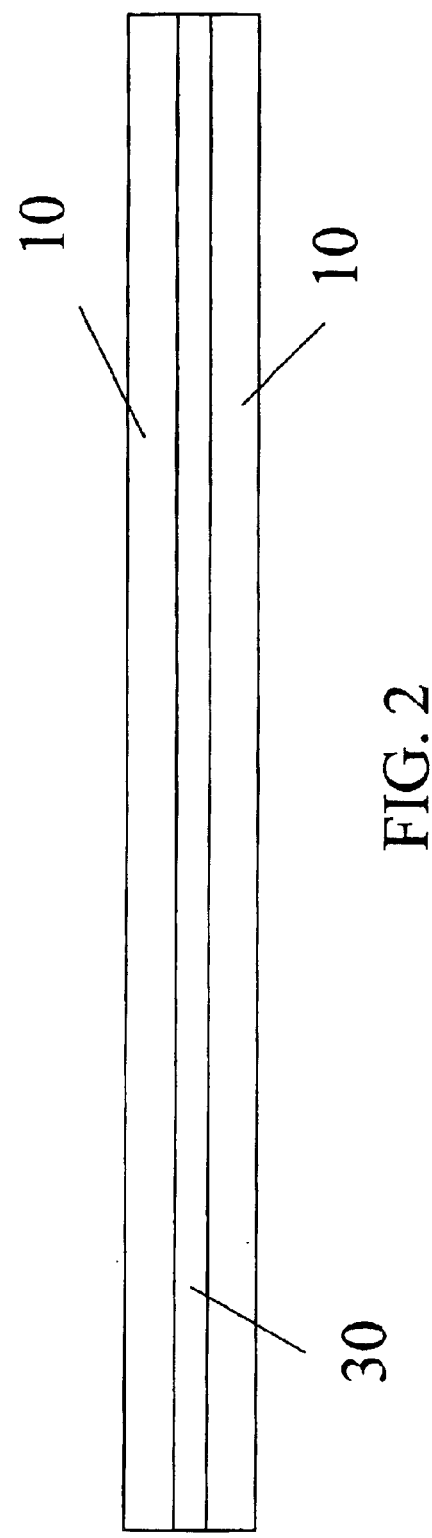
FIG. 2 is a cross section of another layer of the composite material panel with memory.

Turning to FIG. 2, the air passage layer 20 is replaced by a flexible, but solid, layer 30 that has memory. The layer 30 may be bars or sheet having a thickness of 2 mm, made from recycled material, such as shredded or melted plastic, shredded tires, or melted or shredded aluminum.

Figure 3:
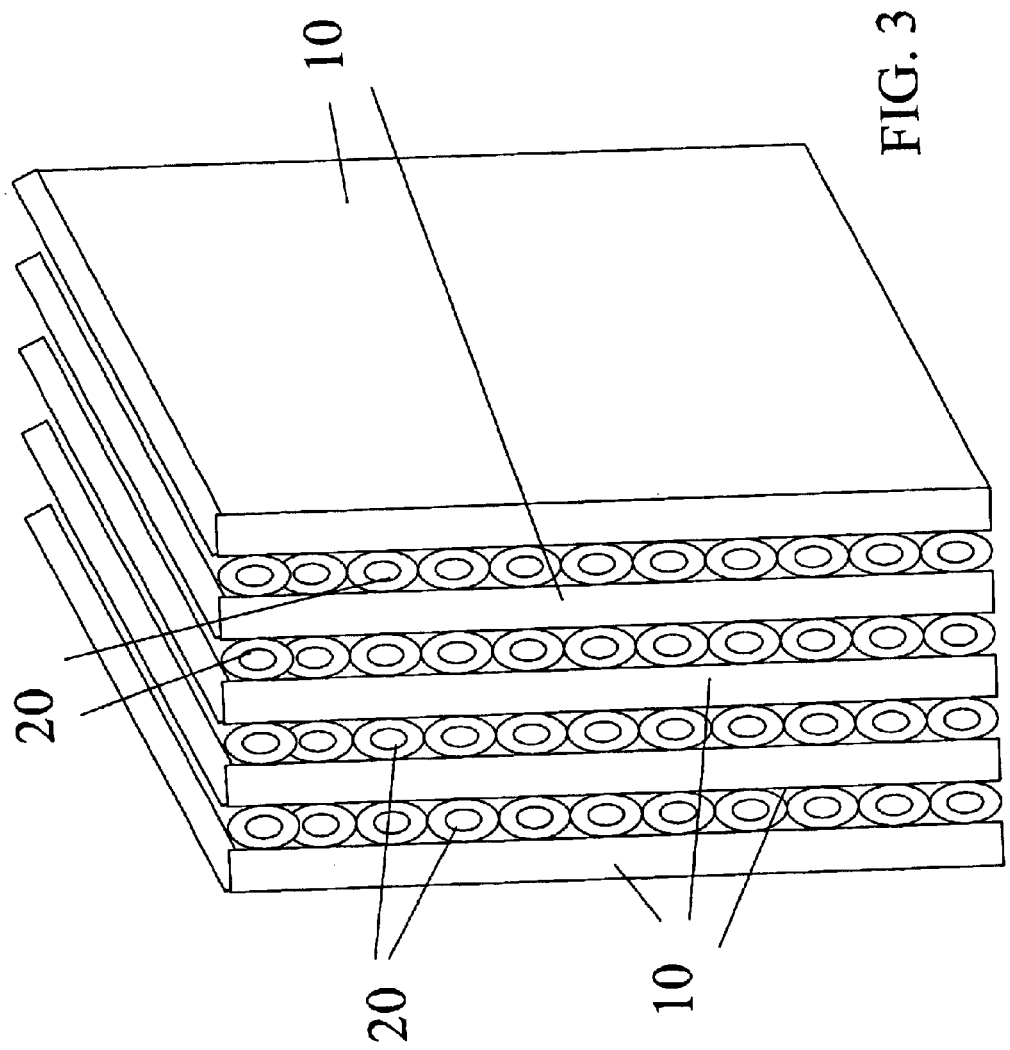
FIG. 3 is a partially broken, perspective view of multiple layers of the composite material panel with memory.

Turning to FIG. 3, a multilayer composite panel is shown having a plurality of solid layers 10 alternating with a plurality of air passage layers 20.

To join or bind together layer 10 with layers 20, a bed of press equipment may be helpful. A single sheet or multiple small sheets of wood having a thickness of 1 mm are laid on a flat surface of the bed of press equipment. A coat of glue is applied on the visible face of these wood sheets. At this point, the wood may be treated for resistance against fire insects and water. The glue itself may contain suitable chemical treatment agents to effect such resistance. Plastic straws, air bubble cushioning, balls, bars or sheet are then disposed onto the glued sheet of wood. Next, the plastic straws, air bubble cushioning, balls, bars or sheet are covered by another pre-glued sheet of wood of 1 mm in thickness. The press equipment is then activated to apply pressure for a few minutes, or however long is necessary, depending upon the nature of the glue, bonding agent or other make of binding.

Figure 4:
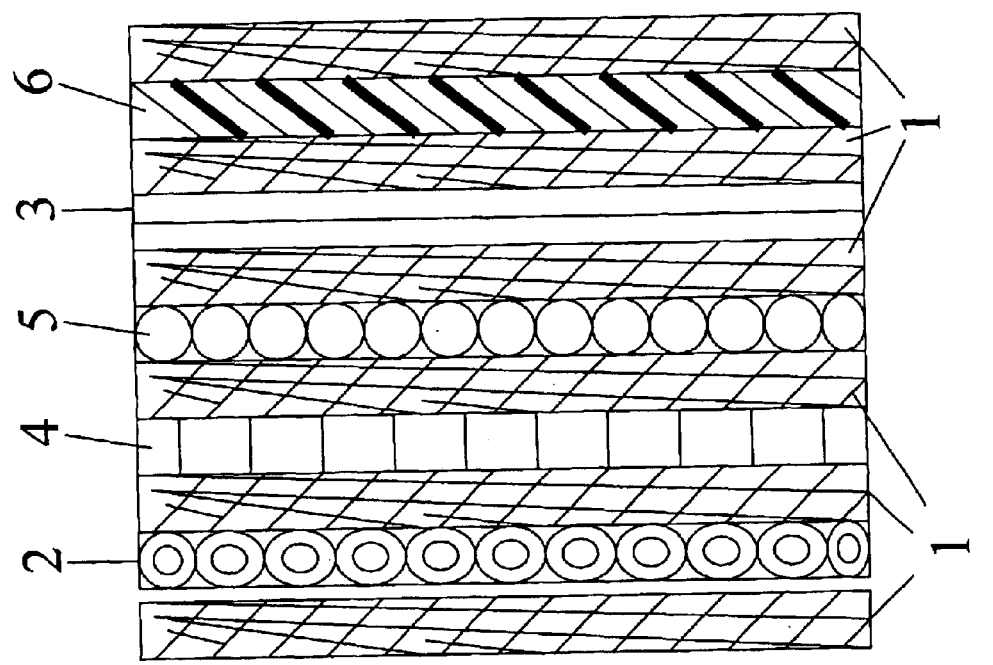
FIG. 4 is an end view of multiple layers of the composite material panel with memory.

FIG. 4 shows a variation of FIG. 3 in that the solid layers 10 are of wood veneer 1 that alternate with a combination of layers 2, 3, 4, 5 or 6. Layers 2 and 5 are exemplified as air passage layers and layers 3, 4 and 6 are exemplified as solid layers. Layer 2 may be tubular in shape while layer 5 may be a series of spherical shapes or solid rod shapes. Layer 3 is exemplified as configured as one or more sheets while layer 5 is exemplified as a series of bars. Layer 6 is exemplified as air cushioning from plastic material.

If the end usage is for packaging, then the construction shown in FIGS. 1 and 2 may be used. If the end usage is for other end uses, then the layers are sandwiched together in the manner of FIGS. 3 and 4. For instance, if used as a building panel, it is preferred that layers 10 be slightly shorter in length than layers 20. This will result is a slight air gap between end-to-end panels between layers 10 of both panels. As a result, if the panels are used to convey heated air circulation in a forced air system (under fan pressure), then this gap will enable the flow of air unimpeded from one panel to the next when the panels are arranged end-to-end. For instance, if the air flow is through a layer having plastic straws, it makes no difference to the smooth passage of air flow whether the layer of plastic straws of one panel are exactly matched with those of the other since the gap allows the air to freely flow into the plastic straws of the next panel. Further, if a portion of one panel is blocked by an obstruction, such as due to a window frame or a door frame or even due to a collapsed plastic straw, the gap allows the air flow to freely bypass the obstruction.

In normal operation, a customer calls, faxes or emails in an order for a panel, specifying either the specific abrasion and mechanical resistance, insulation, flexibility, solidity, and memory properties that are necessary to at least satisfy specific requirements for a panel suited for use in a particular kind of construction. Otherwise, such a customer may confer with technical staff on hand to ascertain such requirements based on the particular kind of construction. As an alternative, the customer may be asked to follow a menu-driven inquiry that leads to identifying specific requirements, whether the menu be phone-based or computer-based over a global network of computers (Internet).

The requirements are recorded, either in written form or electronically in a computer based device. Based on those requirements, a match is determined for recycled or waste materials having properties suited for satisfying those requirements. The match may be done electronically with a software program that simply compares the requirements with known attributes or properties of material stored in a database. If there are more than one match, the matches may be compared with the availability of the particular types of recycled or waste materials to aid in the selection. Cost and weight may also be included to determine the most cost-efficient material to deliver. Based on the number of and desired thickness of the various layers that will comprise the multi-layer, composite panel and based on the number of panels needed (of predetermined lengths) to satisfy the customer demands, an amount of the particular type of recycled or waste material needed to satisfy the demand may be computed. Orders for the recycled or waste material may then be sent electronically to distributors of such material for delivery of the appropriate amount of recycled or waste material for assembly into the multi-layer, composite panels. Such distributors already sort recycled or waste material on their premises.

Figure 5:
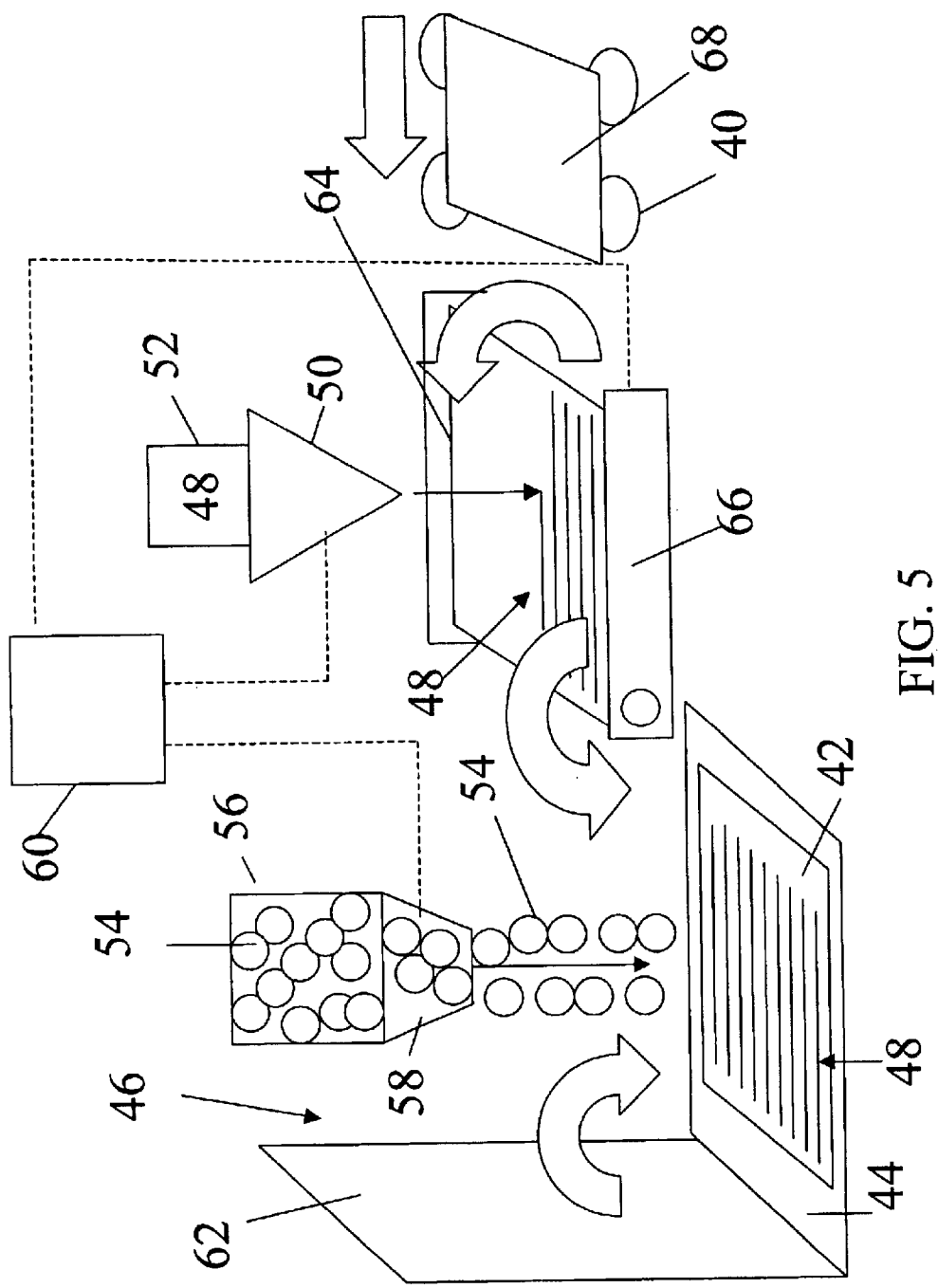
FIG. 5 is a schematic representation of an automated process for manufacturing the composite material panel in accordance with the invention.

The entire assembly process of the multi-layer, composite layer panels may be automated as shown in FIG. 5. A conveyor 40 is used to convey wood veneer sheets 68 in succession to a gluing station where adhesive or glue 48 is dispensed from a glue dispenser 50 that dispenses the adhesive or glue 48 that is within a glue receptacle 52. At the gluing station, an adhesive is applied to each wood veneer sheet in turn. If there is no wood veneer sheet already on a bed 44 of pressing equipment 46, then the leading one of the wood veneer sheets 42 of the set of wood veneer sheets 68 is placed on the bed 44. Otherwise, a subsequent wood veneer sheet 64 of the wood veneer sheets 68 will be flipped over so that its glue side faces down and then lowered or dropped onto recycled or waste material 54 that should already be on the wood veneer sheet 42 before the further wood veneer sheet 64 is lowered or dropped on top. The recycled or waste material 54 was deposited onto the glued side of the wood veneer sheet 42 by a dispenser 58, which dispenses the recycled or waste product 54 stored in an exchangeable storage bin 56.

The chemical bonding agent or adhesive 48 may contain further chemical additives that resist damage otherwise caused from fire, insects and water or such further chemical additives may be applied separately. After the chemical bonding agent or adhesive 48 is deposited onto the wood veneer sheet 42 fully to cover a side, the wood veneer sheet 42 needs to be moved to the bed 44 before the chemical bonding agent or adhesive 48 hardens so that the recycled or waste material 54 may be deposited on top and be joined or bonded to the wood veneer sheet 42.

A controller 60 directs operation of recycled or waste material dispenser 58 to ensure that a sufficient quantity of recycled or waste material 54 is dispensed, the glue dispenser 50 to completely cover a given wood veneer sheet at the gluing station with the chemical bonding agent or adhesive, the timing of delivery of wood veneer sheets 68 from the conveyor 40, the movement of the leading wood veneer sheet 42 from the gluing station to the bed 44, and the movement of the subsequent wood veneer sheet 64 from the gluing station to flip on top of the recycled or waste material 54 on the leading wood veneer sheet 42.

Since separate stations are envisioned, the deposition of the chemical bonding agent or adhesive 48 onto the wood veneer sheet 64 may be done at the same that the wood veneer sheet 42 is in the process of being covered with the recycled or waste material 54. The glued side of the wood veneer sheet 64 is flipped over, such as with a pivoted tray 66, and placed on top of the recycled or waste material 52 on the wood veneer sheet 42. The recycled or waste material 52 is now sandwiched between the two wood veneer sheets 52, 64 to form a multi-layer, composite panel.

The pivoted tray 66 may have a surface on which the wood veneer sheet is placed and be hinged at one side to pivot about the hinge to position the wood veneer sheet 64 over the wood veneer sheet 42 that has the recycled or waste material 52 so that its glued side faces the recycled or waste material 54 on the wood veneer sheet 42. The wood veneer sheet 64 may then be lowered or dropped in place atop the recycled or waste material 54 and released from the pivoted tray 66. The pivoted tray 66 may have sidewalls that have grooves or projecting surfaces that help retain the wood veneer sheet 64 stationary on the tray during the flipping movement, but which may be withdrawn or taken away when the wood veneer sheet 64 is released.

In the event that the pivoted tray 66 is moving the leading wood veneer sheet 42, it would not flip over the leading wood veneer sheet 42, but rather deposit it face up onto the bed 44. This may be done by pivoting about its hinge, but releasing it at an incline onto an inclined ramp (not shown) that allows the leading wood veneer sheet 42 to slide down into position on the bed 44. The ramp would be between the pivoted tray 66 and the bed 44.

After the subsequent wood veneer sheet 64 is placed on top of the recycled or waste material 54, the cover 62 of press equipment 46 may be closed under direction of the controller 60 to apply pressure to the multi-layer, composite panel until the bonding agents or adhesives harden to keep the multi-layer, composite together as an integral unit. An additional layer of recycled or waste material may be applied onto the wood veneer sheet 64 by first applying the chemical bonding agent or adhesive to the topside of the wood veneer sheet 64 and the dispensing the additional layer of recycled or waste material on this topside. Another pre-glued wood veneer sheet may then be applied in a like manner to sandwich this additional layer. Additional layers may be added to build upon the multi-layer, composite panel until all desired properties that satisfy customer requirements are met.

Various sensors may be added to sense the completion of various operations before continuing onto the next step. For instance, sensors may be provided to sense the presence of a wood veneer panel at the gluing station and sense completion of the gluing. As known conventionally, sensors may be provided to sense the quality of the glue dispensement from the glue dispenser 60 to take appropriate corrective measures were warranted. Sensors may be provided to detect that the amount of chemical bonding agent or adhesive 48 in the storage receptacle 52 is running low, i.e., time to replenish. Sensors may be provided to check whether the recycled or waste material 54 is being dispensed onto the glued side of the wood veneer sheet 42 in a uniform manner or any desired manner. Sensors may be provided to sense when the amount of recycled or waste material 54 within the storage bin is running low, i.e., time to replenish. If desired, the storage bin 56 with or without its associated dispenser 58 may be exchanged by another storage bin 56 (with or without its associated dispenser 58) filled with the same or different recycled or waste material. The exchange process may be done under the control of the controller 60. All information detected by the various sensors may be fed to the controller 60 and interpreted and acted upon by the controller 60, which may issue appropriate signals or instructions to take corrective measures.

Indeed, if the customer order is menu-driven or the requirements are otherwise entered into a computer database and appropriate measures are taken to verify the identity of the customer or secure payment, the entire operation may be automated with little or no labor, provided the recycle and waste suppliers cooperate by filling the orders as they come in. If the invention is used by the supplier who collects recycled and waste material, then no such cooperation would even be needed since the manufacture of panels would be an extension of their recycling and waste material processing business. Once sufficient material for construction of the panels is present, which may be sensed by appropriate sensors, the panel formation process may begin to meet the customer requirements.

For purposes of this application, the concept of "joining" and "means for joining" and "joined" is not limited strictly to chemical bonding agents or adhesives. The concept also envisions any form of bonding, even if the recycled or waste material itself effects the bonding to the wood veneer. For instance, if plastics are heated at elevated temperatures, their chemical bonds may break down and change chemically such that they may cling to or bond or otherwise "adhere" to an adjacent surface (such as wood veneer). Thus, even though no separate chemical bonding agent or adhesive is used, the recycled or waste material in effect provides this same property. Thus, the terms "joining", "means for joining", and "joined" encompass both separate constituents that provide these adhering or bonding features and integral properties of recycled or waste material that exhibit such bonding or adhering properties. Indeed, any type of binding is envisioned, even if done mechanically such as with fasteners.

Further, the term "strip" shall mean any form in which the recycled or waste material may take, whether as straws, sheets, bars, balls or cushioning.

While the foregoing description and drawings represent the preferred embodiments of the present invention, it will be understood that various changes and modifications may be made without departing from the spirit and scope of the present invention.

What is claimed is:

1. A product of manufacture, comprising: a multi-layer, composite panel having constituents that include a layer of recycled or waste strips arranged side by side and two sheets of wood veneer that sandwiched the layer of recycled or waste strips, the strips being selected from a group consisting of plastic, metal and tires and being joined to the two sheets of wood veneer; and chemical treatment agents applied to the two sheets of wood veneer to resist damage from fire.

2. A product of claim 1, further comprising chemical treatment agents applied to at least one of the two sheets of wood veneer to resist damage from insects and water.

3. A product of claim 1, further comprising a further sheet of wood veneer and further strips of the recycled or waste material that are comprised of a different kind of the recycled or waste material than that of the sandwiched layer, the further strips being joined to the one of the two sheets of wood veneer and to the further sheet of wood veneer.

4. A product of claim 1, wherein the sandwiched layer is arranged so that the recycled or waste material forms air channels between the two sheets of wood veneer that extend along an entire length of the two sheets of wood veneer.

5. A product of claim 1, wherein the sandwiched layer is of a construction selected from a group consisting of straws, air bubble cushioning, balls and bars.

6. A product of claim 1, wherein the sandwiched layer is of a length that is shorter than a length of the two sheets of wood veneer.

7. A product of claim 1, wherein the recycled or waste strips are arranged to form air channels having the memory to resiliently return to an original state after removal of distortion forces.

8. A product of claim 1, wherein the wood veneer is compounded sawdust bonded together.

9. A product of claim 1, wherein the plastic is selected from a group consisting of recycled bottles, cans, carpets or rugs made of plastic or synthetic material, the metal is selected from a group consisting of recycled aluminum and tin cans, plates and foil, the tires are selected from a group consisting of recycled tire components and used tires.

10. A product of claim 1, wherein the strips are of a type selected from a group consisting of straws, air bubble cushioning, balls, bars and sheets.

11. A product of claim 3, wherein the strips of the constituents are of a type selected from a group consisting of straws, air bubble cushioning, balls, bars and sheets.

12. A product of claim 11, wherein the further strips are of a different type than the strips of the constituents yet selected from the group consisting of straws, air bubble cushioning, balls, bars and sheets.

13. A product of claim 11, wherein the further strips are of a same type as that of the strips of the constituents and selected from the group consisting of straws, air bubble cushioning, balls, bars and sheets.

14. A product of claim 1, further comprising additional layers of the recycled or waste strips and the wood veneer that are attached to the multi-layer, composite panel to form an integral unit to provide the integral unit with sufficient abrasion and mechanical resistance, insulation, flexibility, solidity, and memory properties to satisfy the specific requirements suited to a particular kind of construction that are not be met by the multi-layer composite panel alone without the additional layers.

15. A product of claim 3, wherein the strips of the constituents and the further strips together provide sufficient abrasion and mechanical resistance, insulation, flexibility, solidity, and memory properties to satisfy the specific requirements suited to a particular kind of construction that are not be met by the strips of the constituents alone without the further layers.

* * * * *